United States Patent [19]
Heckendorn et al.

[11] Patent Number: 5,903,306
[45] Date of Patent: May 11, 1999

[54] CONSTRAINED SPACE CAMERA ASSEMBLY

[75] Inventors: Frank M. Heckendorn, Aiken, S.C.;
Erin K. Anderson, Augusta, Ga.;
Casandra W. Robinson, Trenton;
Harriet B. Haynes, Aiken, both of S.C.

[73] Assignee: Westinghouse Savannah River Company, Aiken, S.C.

[21] Appl. No.: 08/954,255

[22] Filed: Oct. 20, 1997

Related U.S. Application Data

[63] Continuation of application No. 08/515,954, Aug. 16, 1995, abandoned.

[51] Int. Cl.⁶ ................................................. H04N 7/18
[52] U.S. Cl. ............................... 348/85; 348/82; 348/84; 348/42
[58] Field of Search ..................... 348/82–85, 42, 348/72, 65, 335, 358; 600/166–171, 175–176, 188–189; 359/362, 363; 396/26, 28, 74, 324, 432; 356/241.1–241.6; H04N 7/18

[56] References Cited

U.S. PATENT DOCUMENTS

| | | | |
|---|---|---|---|
| 3,178,994 | 4/1965 | Lang | 348/85 |
| 3,358,078 | 12/1967 | Ratliff, Jr. | 348/42 |
| 3,832,724 | 8/1974 | Duval | 348/84 |
| 3,974,330 | 8/1976 | Askowith et al. | 348/85 |
| 4,194,218 | 3/1980 | Hasegawa | 348/84 |
| 4,229,762 | 10/1980 | Healy | 348/85 |
| 4,272,781 | 6/1981 | Taguchi et al. | 348/82 |
| 4,424,531 | 1/1984 | Elter et al. | 348/83 |
| 4,532,545 | 7/1985 | Hanson | 348/83 |
| 4,544,236 | 10/1985 | Endo | 359/814 |
| 4,651,201 | 3/1987 | Schoolman | 348/45 |
| 4,656,999 | 4/1987 | Storz | 600/104 |
| 4,660,982 | 4/1987 | Okada | 600/117 |
| 4,766,577 | 8/1988 | Clerke et al. | 367/35 |
| 4,855,820 | 8/1989 | Harbour | 348/85 |
| 4,862,873 | 9/1989 | Yajima et al. | 348/45 |
| 4,926,257 | 5/1990 | Miyazaki | 348/45 |
| 4,938,060 | 7/1990 | Sizer et al. | 348/85 |
| 4,965,601 | 10/1990 | Canty | 348/82 |
| 4,967,092 | 10/1990 | Fraignier et al. | 356/241.1 |
| 5,061,995 | 10/1991 | Lia et al. | 348/68 |
| 5,068,720 | 11/1991 | Herlitz et al. | 348/82 |
| 5,084,764 | 1/1992 | Day | 348/84 |
| 5,107,705 | 4/1992 | Wraight et al. | 348/85 |
| 5,156,141 | 10/1992 | Krebs et al. | 600/112 |
| 5,222,477 | 6/1993 | Lia | 348/45 |
| 5,275,038 | 1/1994 | Sizer et al. | 348/85 |
| 5,335,061 | 8/1994 | Yamamoto et al. | 356/241.1 |
| 5,385,138 | 1/1995 | Berry | 600/166 |
| 5,457,288 | 10/1995 | Olsson | 348/84 |
| 5,512,036 | 4/1996 | Tamburrino et al. | 600/172 |
| 5,566,020 | 10/1996 | Bradford et al. | 359/390 |
| 5,604,532 | 2/1997 | Tillmanns | 348/85 |
| 5,652,617 | 7/1997 | Barbour | 348/85 |

Primary Examiner—Bryan Tung
Assistant Examiner—Vu Le
Attorney, Agent, or Firm—Hardaway Law Firm, P.A.

[57] ABSTRACT

A constrained space camera assembly which is intended to be lowered through a hole into a tank, a borehole or another cavity. The assembly includes a generally cylindrical chamber comprising a head and a body and a wiring-carrying conduit extending from the chamber. Means are included in the chamber for rotating the body about the head without breaking an airtight seal formed therebetween. The assembly may be pressurized and accompanied with a pressure sensing means for sensing if a breach has occurred in the assembly. In one embodiment, two cameras, separated from their respective lenses, are installed on a mounting apparatus disposed in the chamber. The mounting apparatus includes means allowing both longitudinal and lateral movement of the cameras. Moving the cameras longitudinally focuses the cameras, and moving the cameras laterally away from one another effectively converges the cameras so that close objects can be viewed. The assembly further includes means for moving lenses of different magnification forward of the cameras.

18 Claims, 6 Drawing Sheets

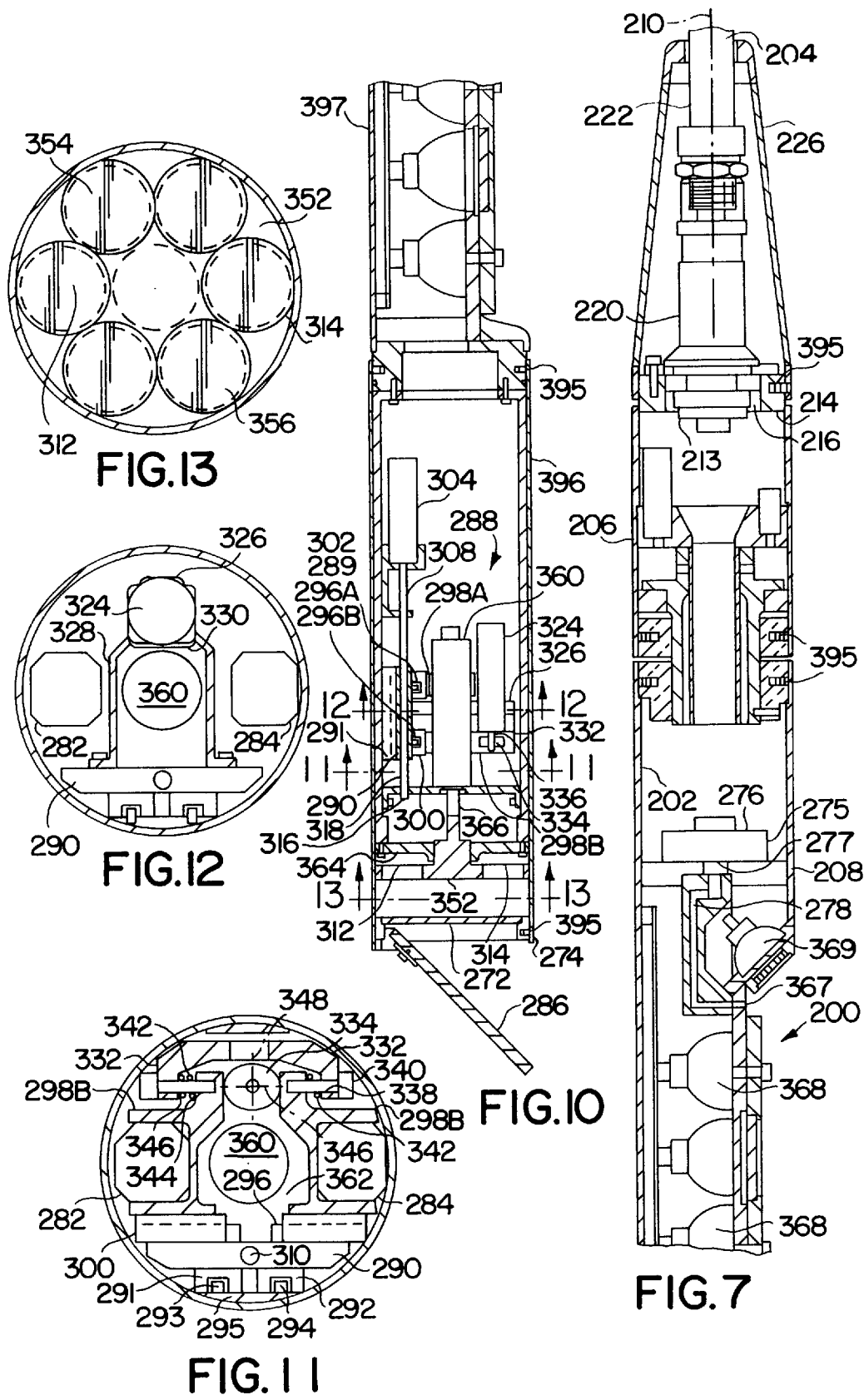

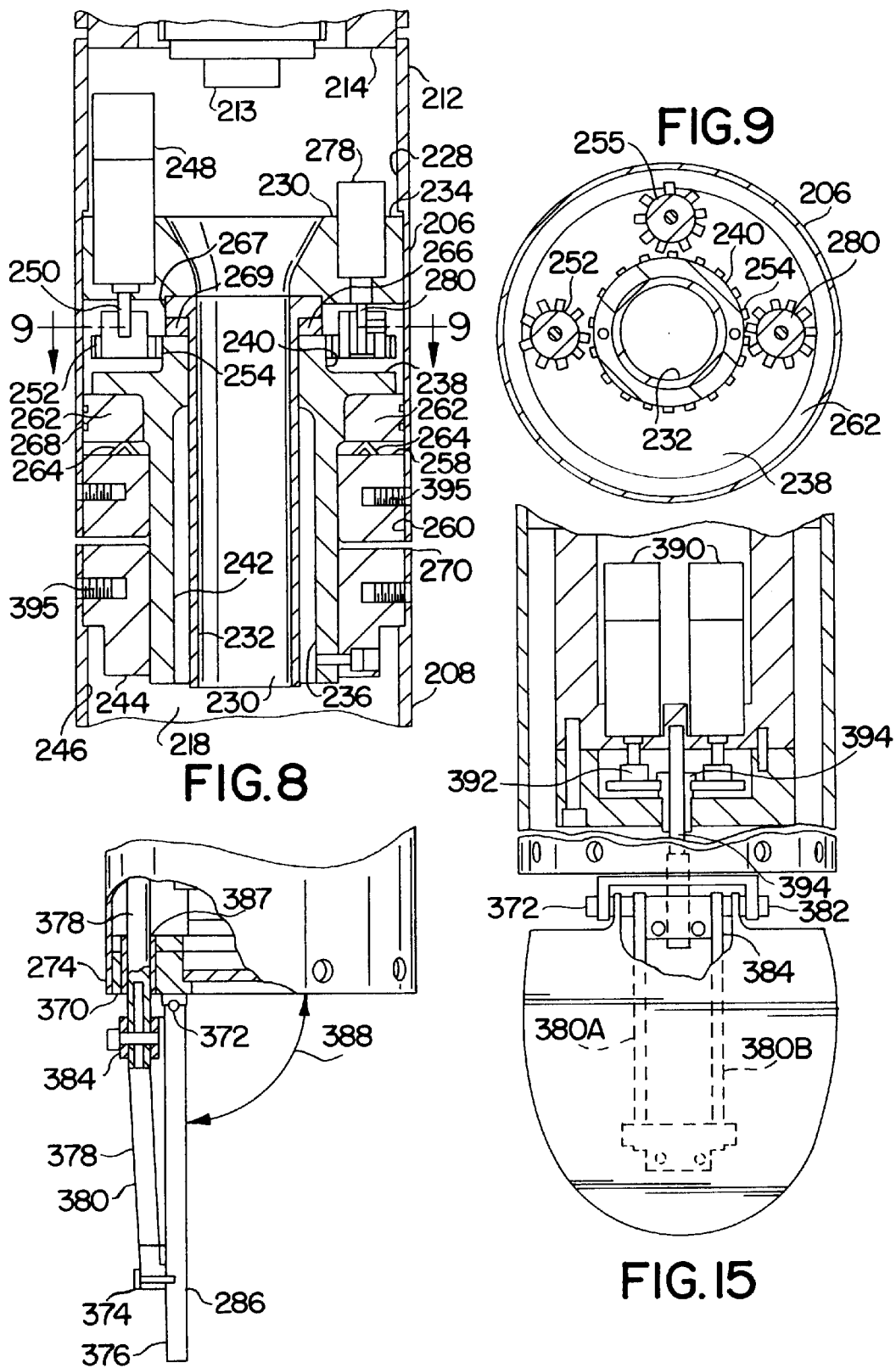

CONSTRAINED SPACE CAMERA ASSEMBLY

This application is a file wrapper continuation of application Ser. No. 08/515,954, filed Aug. 16, 1995, now abandoned.

The United States Government has rights in this invention pursuant to Contract No. DE-AC09-89SR18035 between the U.S. Department of Energy and Westinghouse Savannah River Company.

1. FIELD OF THE INVENTION

The present invention relates to cameras in general and more particularly, to a camera assembly for use in constrained space.

2. DISCUSSION OF BACKGROUND

Constrained space cameras have been designed for use in a variety of different environments.

U.S. Pat. No. 4,272,781, for example, describes a camera equipped with rollers mounted to the assembly's outer housing, so that the assembly can be rolled under objects and maneuvered on the ground in areas having low overhead clearance. Another camera, described in U.S. Pat. No. 4,424,531, is equipped with cooling means and can be used in environments having extremely hot temperatures.

The constrained space camera assemblies of the prior art typically have a mirror or mirrors installed thereon so that the camera can view a wider range without movement of the camera. However, the prior art cameras suffer from serious limitations. Known prior art constrained space camera assemblies provide only monoscopic viewing and are ineffective in situations requiring enhanced stereoscopic imaging. Prior art cameras also have poor means of providing axial camera rotation. The assembly of U.S. Pat. No. 4,532,545, for example, is axially rotated by rotating the conduit which carries the assembly. Such a method imparts structural stress on the conduit and results in imprecise control over the assembly's radial orientation. Furthermore, many prior art constrained space cameras, such as that described in U.S. Pat. No. 4,532,545, have components that sometimes extend beyond the envelope defined by the assembly in the assembly's most compact configuration. If such a camera assembly fails while extended, then the assembly may be difficult to retrieve through the path in which it entered the viewing area.

Constrained space cameras are often used in environments having volatile and combustible gases. These gases can easily enter the camera assemblies in the prior art. A spark from electrical instrumentation within a camera assembly can ignite such gases to cause an explosion.

In view of the above, there is a need for an improved constrained space camera assembly which overcomes the above listed problems.

SUMMARY OF THE INVENTION

According to its major aspects and broadly stated, the present invention is a camera assembly for use in constrained space. The present camera assembly can be adapted to perform a variety of functions, such as 360 degree axial rotation, stereoscopic viewing and convergence, focus and zoom.

The assembly comprises a cylindrical chamber housing a camera or a pair of cameras and is intended to be lowered into a tank, a borehole, or another cavity through a hole having a width that can be almost as small as that of the chamber. The chamber is raised and lowered using an electrical conduit which also houses electrical power and control wiring for operating the camera or cameras housed in the chamber.

In a preferred embodiment, the chamber of the assembly comprises a bottom section (a body) which engages a stationary top section (a head). The body can be rotated 360 degrees about the stationary head to provide full radial camera viewing. The body engages the head in an airtight fashion such that air cannot escape or enter the chamber at the interface between the two sections Combustible gases are common in areas where constrained space camera assemblies are used. The chamber of the present assembly is airtight, and is pressurized to ensure that such combustible gases cannot enter the chamber. A differential pressure detector is installed in the chamber which detects pressure differentials between the interior and exterior of the chamber. A loss of positive pressure detected by the differential pressure detector indicates that there is a breach in the chamber. Preferably, the differential pressure sensor communicates with a relay that cuts off the voltage supplied to electrical equipment in the chamber in the event a breach is detected. This arrangement eliminates the chance of a spark igniting a combustible gas entering the chamber.

The electrical conduit extending from the chamber is in fluid communication with the chamber such that a breach in the conduit will also be detected by the differential pressure detector installed in the chamber.

A camera assembly according to the invention may include a pair of cameras oriented downward and disposed side by side in the cylindrical chamber. Lenses of the cameras are spaced apart from their respective cameras, and can be moved laterally outward away from each other. Moving the cameras laterally away from one another enables close objects to be focused on and provides convergence, which in the prior art is performed by angling a pair of cameras toward one another.

Stereoscopic cameras of the assembly can be mounted on a mounting apparatus that is made to allow longitudinal movement of the cameras along the length of the assembly, and lateral movement of the cameras laterally away from one another. Lateral movement of the cameras provides convergence, and longitudinal movement of the cameras allows the cameras to be focused.

Lenses of the cameras are mounted on a lens plate that carries a plurality of sets of lenses, each set having a different magnification. Magnification of the cameras (zoom) is adjusted by rotating the lens plate such that a different set of lenses is positioned forward of the cameras.

The camera assembly is designed to remain in its most compact configuration during each mode of operation of the assembly. Thus, the assembly can be easily retrieved upon breakdown, regardless of its mode of operation at the time of the breakdown.

A major feature of the invention is the chamber that includes a bottom section (a body) that is received on a stationary top section (a head), and means for axially rotating the body with respect to the head. The axial rotating means provides controlled axial rotation of the chamber for 360 degree radial viewing, and eliminates the need to rotate the conduit connected to the chamber for full radial viewing.

Another major feature of the invention is the airtight engagement between the chamber's head and body. The airtight engagement allows airtight axial rotation of the body with respect to the head and prevents combustible gases from entering the chamber through the gap between the head and body.

Another major feature of the invention is the pressurizing means which pressurizes the chamber. The pressurizing means prevents combustible gases from entering the chamber.

Another major feature of the invention is the differential pressure detector installed in the chamber, which communicates with a relay to cut off voltage supplied to electrical equipment in the chamber if positive pressure is lost. The differential pressure detector eliminates the chance of spark from an electrical component in the chamber igniting a combustible gas that enters the chamber.

Another major feature of the invention is the engagement, in fluid communication, between the chamber of the assembly and the conduit of the assembly. Engaged in fluid communication, the conduit and the chamber together form a continuous housing, such that, when pressurized, a breach occurring at any point in the assembly, whether the breach is in the chamber or in the conduit, can be detected by the assembly's leak detection system.

Another major feature of the invention is the separation between camera and lens combined with means to move the cameras of the assembly laterally apart. Camera-lens separation combined with lateral movement means enable stereoscopic cameras to focus on close objects and provide convergence in a constrained space. Convergence in the prior art requires that dual cameras be angled apart.

Another major feature of the invention is the mounting apparatus on which stereoscopic cameras of the assembly are mounted. The mounting apparatus comprises means allowing both longitudinal and lateral movement of the cameras.

Still another feature of the invention is the rotating lens-carrying plate positioned in the line of view of the cameras. The lens plate facilitates a zoom function in a minimal amount of space.

Another feature of the invention is the relative positioning of the elements in the assembly. The relative positioning of the elements balances the interest of utility with the interest of constrained space to provide a fully functional constrained space camera.

Other features and advantages will become apparent to those skilled in the art from a careful reading of the Detailed Description of Preferred Embodiments accompanied by the following drawings.

BRIEF DESCRIPTION OF THE DRAWINGS

In the drawings,

FIG. 7 is a cross-sectional side view of the top half of a camera assembly chamber according to the invention;

FIG. 8 is a cross-sectional side view of the camera assembly taken along line 8—8 of FIG. 6 showing the engagement between the assembly chamber's head and body;

FIG. 9 is a cross-sectional view of the camera assembly taken along line 9—9 of FIG. 8 showing the engagement between the assembly's drive motor and inner sleeve;

FIG. 10 is a cross-sectional side view of the bottom half of a camera assembly chamber according to the invention;

FIG. 11 is a cross-sectional view taken along line 11—11 of FIG. 10 showing the assembly's camming means for moving a pair of cameras laterally apart;

FIG. 12 is a cross-sectional view taken along line 12—12 of FIG. 10 showing the assembly's support means for supporting a cam motor;

FIG. 13 is a cross-sectional view taken along line 13—13 of FIG. 10 showing the assembly's lens plate;

FIG. 14 is fragmentary rear view of a camera assembly showing means according to the invention for moving a mirror attached to the chamber of the assembly;

FIG. 15 is a fragmentary cross-sectional side view of a camera assembly showing means according to the invention for moving a mirror attached to the chamber of the assembly;

DETAILED DESCRIPTION OF PREFERRED EMBODIMENTS

Figure 1:
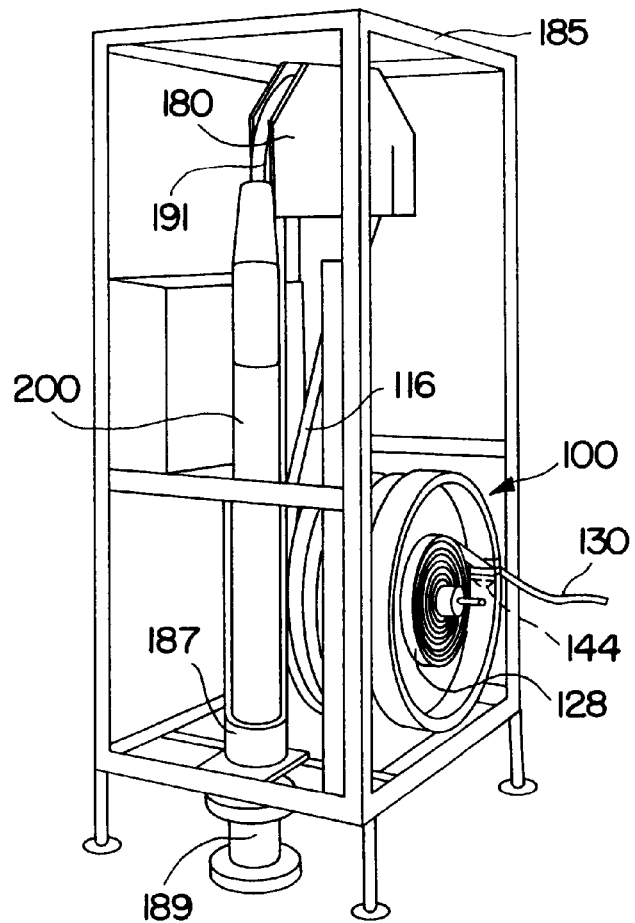
FIG. 1 is a perspective view of a system including a camera assembly as disclosed which is lifted and lowered from a waste storage tank with use of a reel for electrical wiring as disclosed.

FIG. 1 shows a system having an electrical wiring reel 100 which is used in combination with a pulley means 180 to lift and lower a constrained space camera assembly 200. Wiring is disposed in flexible conduit 116, in coil 128, and in feeder conduit 130 and carries control signals and power from a remote control unit (not shown) electrically connected with feeder conduit 132 to camera assembly 200, and further carries feedback and video signals from assembly 200 to the remotely located control unit. Frame 185 supports reel 100, pulley means 180, and guide 187 which guides camera assembly 200 and positions assembly 200 in a desired position. A riser pipe 189 having a typical diameter of about 4 inches extends upward from the tank, cavity, or borehole into which assembly 200 is lowered. Guide 187 positions assembly 200 such that assembly 200 will enter riser pipe 189 when assembly is lowered. The diameter of assembly 200 is slightly less than that of riser pipe. In the system shown, assembly 200 has a diameter of about 3½ inches.

Figure 2:
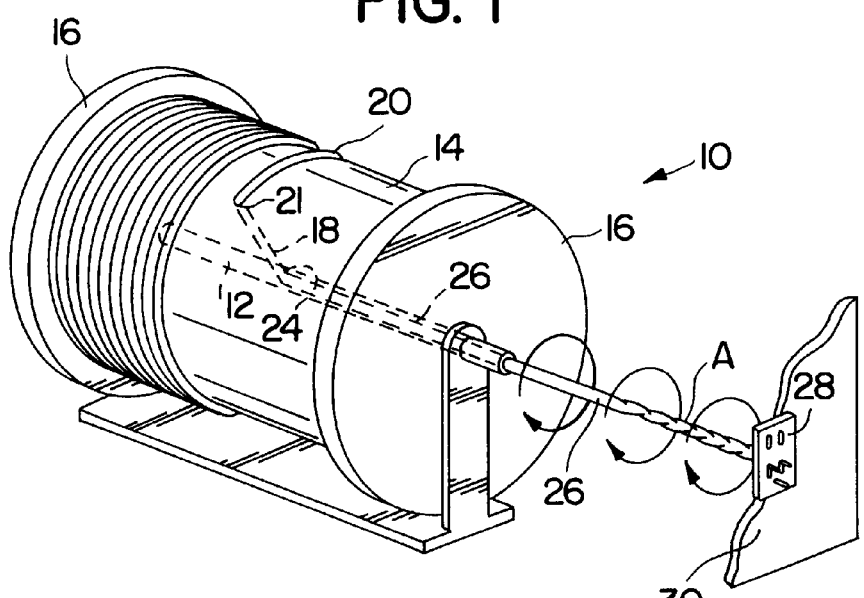
FIG. 2 is a perspective view of a prior art reel for electrical wiring.

FIG. 2 shows a prior art reel carrying electrical wiring having a feeder section leading to remote instrumentation connected thereto. The prior art reel 10 includes a shaft 12, a drum 14 and two side members 16 connecting the shaft and drum. End 18 of flexible conduit 20 carried by reel extends through hole 21 in drum through the drum annulus and into hole 24 of shaft 12. Within shaft 12 flexible conduit 20 is connected with feeder section 26. It is seen that when drum 14 and shaft 12 are rotated, that feeder section 26 will rotate. Feeder section 26 will normally be fixed to a fixed point 28 at remote instrumentation 30. When drum 14 is rotated, feeder section 26 will be twisted about its own axis and will experience structural stress as indicated at A. A set of slip rings could be installed in the length of feeder section 26 to absorb the feeder section's axial twisting. However, slip rings are sensitive to noise and interference and experience resistance changes. Further, slip rings generally do not have mixed configuration contact arrangements. A slip ring that conducts both control signals and high currents would generally require that a power conductor slip ring be disposed concentrically about a low current control wire slip ring, of a type used for noise sensitive signals.

Figure 3A:
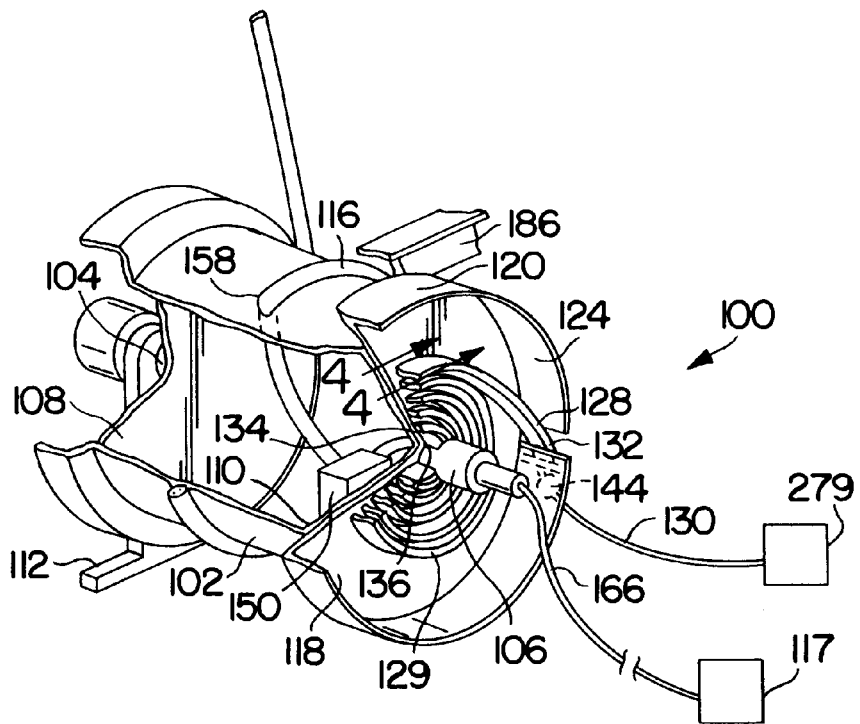
FIG. 3a is a perspective view of a reel according to the invention having a cutaway portion showing the interior of the drum.
Figure 3B:
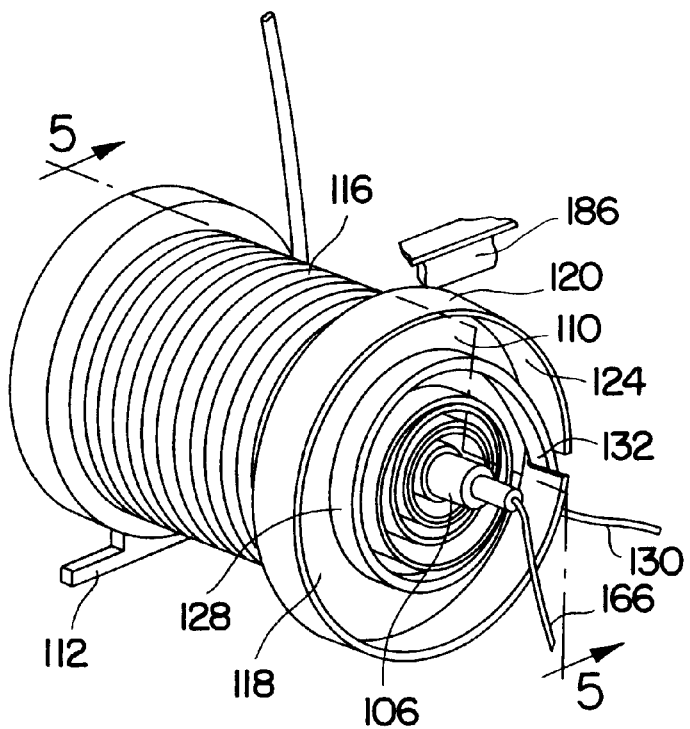
FIG. 3b is a perspective view of a reel according to the invention as shown in FIG. 3a after clockwise rotation of the drum.
Figure 4:
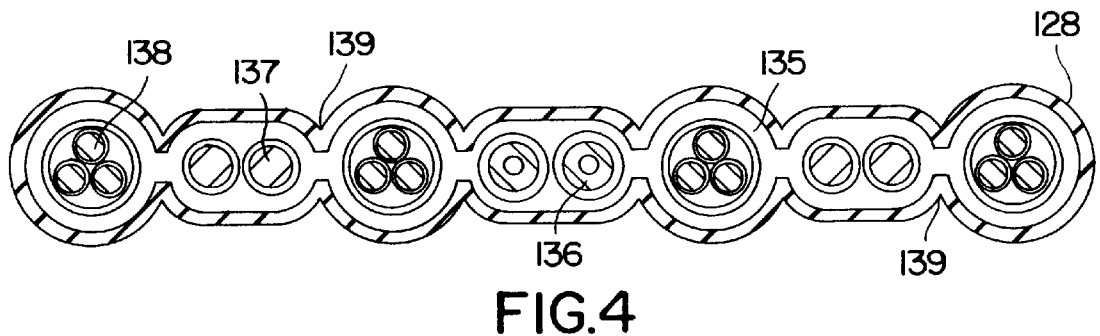
FIG. 4 is cross-sectional view taken along line 4—4 of FIG. 3a showing a cross-section of the coil having wiring disposed therein.
Figure 5:
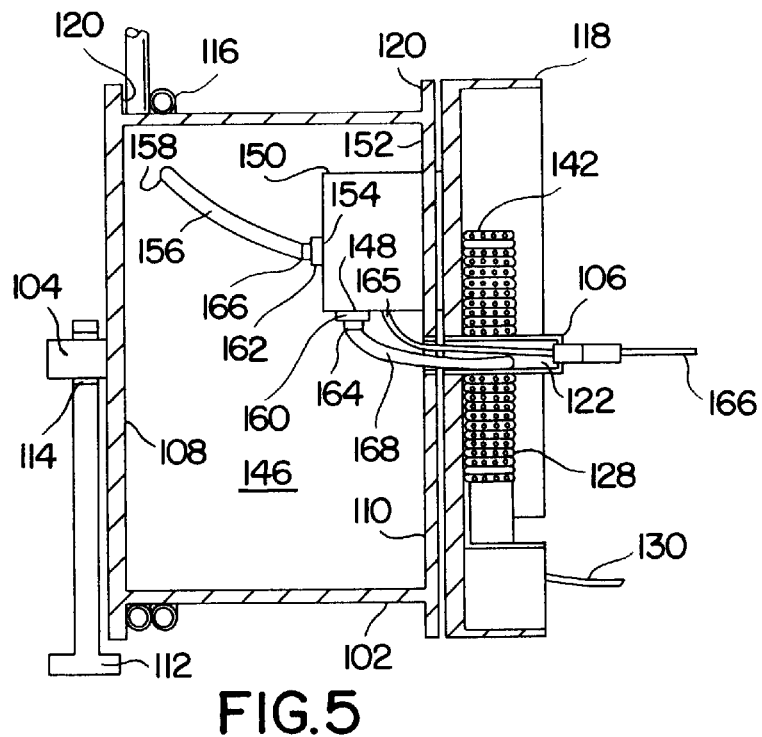
FIG. 5 is a cross-sectional side view of the reel taken along line 5—5 of FIG. 3b.

A preferred embodiment of the reel of the present invention is shown in FIGS. 3, 4, and 5. Reel 100 includes a drum 102 having first and second shaft members 104 and 106 extending perpendicularly from first and second side plates 108 and 110 of drum 102. First shaft member 104 is supported by shaft support member 112 and rotates within hole 114 of shaft support member. Drum 102 may have the same diameter as shaft members 104 and 106. If drum 102 and shaft members 104 and 106 are of the same diameter, then drum 102 will not have side plates 108 and 110.

Drum 102 carries flexible conduit 116 which extends from drum 102 to a remote article of equipment requiring electrical power or control. As drum 102 and shaft members 104 and 106 are rotated in a first direction, flexible conduit 116 rolls onto drum 102. As shaft and drum are rotated in an opposite direction, flexible conduit 116 unrolls from drum 102. First side plate 108 and second side plate 110 should extend outward beyond the periphery of drum to form guard rails 120, which prevent flexible conduit 116 from slipping off of drum 102. Drum 102 may be rotated in many ways including by use of a manual crank. Most preferably, however, drum 102 is driven by a motor. Shaft member 104 may be coupled directly to a gear box which is driven by an electric motor. For example, the gear box may be a 1000:1 high reduction gear box, and the motor may be a ⅙ horsepower, 1700 RPM electric motor when reel 100 is used to lift and lower a load of about 25 pounds.

Stationary member 118 is not attached to drum 102 or shaft member 106. Instead, stationary member 118 is positioned proximate with second side plate 110 of drum, and may be fixedly welded to frame member 186 of a frame 185 which supports and houses reel 100. Stationary member 118 has hole 122 through which second shaft member 106 extends. Thus, second shaft member 106 is journaled by stationary member 118. Drum 102 and shaft members 104 and 106 rotate while stationary member 118 remains in a fixed position. Stationary member 118 further has a ridge 124 extending outward perpendicularly from the periphery of stationary member 118. A protective plate (not shown) may be applied over ridge 124.

Coil 128 is disposed on stationary member 118. It will be seen that coil 128 is disposed to prevent feeder conduit 130 from twisting about its axis when drum 102 is rotated. Coil 128 comprises a first end 132 and a second end 134. First end is secured to ridge 124 of stationary member 118, and second end 134 is secured to second shaft member 106 at notch 136 formed in second shaft member 106. Coil 128 is positioned to be coaxial with shaft members 104 and 106 and drum 102.

A cross-section of coil 128 is shown in FIG. 4. Coil 128 is preferably made of polyurethane or of another elastomer having similar properties and is in the general configuration of an elongated flattened tube. Defined by coil 128 is space 135 for receiving wiring 142. Video cables 136, power wires 137 and, control signal wires 138, and other wiring may be disposed in coil 128. Wires and cables within coil 118 are disposed symmetrically as shown so that coil 128 will wind and unwind evenly. Pinched points 139 formed on coil 128 prevent wires and cables within coil 128 from shifting position. The walls of coil 128 should be sized have sufficient stiffness and resilience so that coil 128 tends to return to an unwound configuration after it is wound and released. Coil 128 may be made from 0.045 in. thick J120 abrasion resistant polyurethane, of the type available from "W. L. GORE & ASSOCIATES" Inc., of Manor, Tex. The preferred length of coil 128 will depend on the length of flexible conduit 116 which will be unrolled from drum 102. Preferably, coil 128 is at least as long as the length of flexible conduit 116 which is unrolled from drum 102. Coil 128 may be slightly shorter than the length of flexible conduit which is unrolled if shaft member 106 on which coil 128 is wound has a smaller diameter than drum 102.

First end 132 of coil 128 is secured at ridge 124 of stationary member 118 by means of a clamp (not shown) or by other well known affixing means. A connector 144 may be disposed at first end 132 for receiving coil 128 and for providing means for connecting wiring of feeder conduit 130 with wiring of coil 128. Connector 144 may be a standard electrical connector having multiple contact arrangements of mixed configurations, including control wire, coaxial, triaxial, fiber optic, fluid/pneumatic and high voltage. Connector 144 may be Series E or Series K connector of the type manufactured by "LEMO", Inc. of Santa Rosa, Calif. Coil 128 may extend beyond ridge 124 of stationary member 118 and may be input directly into a remote article of equipment. For clarity, the section of wire housing extending from stationary member 118, whether the housing is a coil or whether the housing is a section of conduit, shall herein be referred to as "feeder conduit".

Second end 134 of coil 128 is attached at notch 136 formed in second shaft member 106. Coil 128 may be secured in notch 136 with use of adhesives or by other well known securing means. Second shaft member 106, attached to drum 102, rotates while stationary member 118 remains stationary. Thus, it is seen that first end 132 of coil 128 will remain at a fixed point (at ridge 124), and that second end 134 of coil will be secured at a point that rotates at notch 136. Because first end 132 is stationary and second end 134 rotates, it is seen that coil 128 will be wound when drum 102 is rotated in a first direction and that coil 128 will be unwound when drum 102 is rotated in a second direction. FIG. 3b shows the reel of FIG. 3a after drum 102 is rotated in a clockwise direction. It is seen that when drum 102 is rotated in a clockwise direction, coil 128 becomes slack and gradually becomes unwound. It will be recognized that the direction of drum rotation (clockwise or counter-clockwise) resulting in coil unwinding will depend on the orientation of coil 128 when coil 128 is installed. That is, counter-clockwise rotation of drum 102 would result in coil unwinding if coil 128 is removed and reinstalled such that outer edge 129 of coil 128 abuts stationary member 118.

Coil 128 is formed to extend from second end 134 of coil 128 at notch 136 through second shaft member 106 and into drum interior 146, where it is received by a first port 148 of junction box 150. Junction box 150 is secured to inner surface 152 of second side plate 110 as shown, and further has a second port 154 for receiving drum end 156 of flexible conduit 116 carried by drum 102. Drum end 156 of flexible conduit 116 extends through aperture 158 on drum and into drum interior 146. Formed in first and second ports 148 and 154 of junction box 150 are female ends 160 and 162 of standard electrical connectors as discussed previously. Male ends 164 and 166 of electrical connectors are formed at drum end 168 of coil 128 and at drum end 156 of flexible conduit 116 and are received by female ends 160 and 162 respectively. Within junction box 150 hard wiring connects female ends 160 and 162 installed at first and second ports 148 and 154.

Flexible conduit 116, coil 128, and feeder conduit 130 all house wiring 142. The term "wiring" herein shall refer to an electrical control wire or a plurality of such wires; an electrical power wire or a plurality of such wires; a coaxial or triaxial cable or a plurality of such cables; or a fiber optic cable or a plurality of such cables. "Wiring" shall further refer to any combination of the above types of wiring.

Wiring 142 housed in feeder conduit 130, wiring of coil 128, and wiring of flexible conduit 116 form a continuous line of wiring which provide means for delivering control signals or power between remote equipment electrically connected with feeder conduit and a remote article such as camera assembly 200 electrically connected with flexible conduit 116 of drum 102. It is seen that wiring 142 will not be twisted when drum 102 is rotated. Instead, coil 128 will "absorb" drum rotation by winding and unwinding coil 128. Wiring 142 disposed in coil 128 will be bent along the length of such wiring and will become increasingly and then less curved as coil 128 is wound and unwound, but there will be no axial twisting of such wiring as in the prior art (see FIG. 2). If wiring 142 is a plurality of wires, then the relative positioning of such wires will not be disturbed during drum rotation.

Reel 100 may include a leak detection system for detecting breaches in flexible conduit 116, and possibly in an article of equipment attached to flexible conduit 116. A leak detection system according to the invention includes a pressurizing means for pressurizing conduit 116 to prevent flow of air into the conduit and pressure sensing means for sensing losses in pressure resulting from air leaking through a breach in conduit 116.

In making an air detection system, junction box 150 may be formed to have a third port 165 for receiving an air hose 166. Air hose 166 may extend through second shaft member 106 into drum interior 146 and into junction box 150. Flexible conduit 116 is pressurized by a pressuring means such as an air pump 117, which supplies air to flexible conduit 116 through air hose 166. Air pump 117 should be a self-limiting air pump which is incapable of producing a pressure of more than about 5.0 PSIG. Most preferably, air pump 117 pressurizes conduit 116 (and an attached equipment article, if the article is in fluid communication with conduit 116) to a pressure of between about 1.0 PSIG and about 2.0 PSIG.

Air should not leak through connector ends 160 and 164 at first port 148 but should pass through connector ends 162 and 166 at second port 156 so that flexible conduit 116 will be pressurized. Standard electrical connectors such as Series K and Series E "LEMO", Inc. electrical connectors are formed so as not to allow passage of fluid between male and female ends of such connectors. Thus, an unmodified connector disposed and sealed at first port 148 will ensure that air will not pass from junction box 150 and into coil 128 through first port connector ends 160 and 164. In order to allow passage of air from junction box 150 into flexible conduit 116 through flexible conduit connector ends 162 and 166, flexible conduit connector ends 162 and 166 may be modified. Flexible conduit connector ends 162 and 166 may be modified to all passage of air therethrough by removing one or more contact pins of female end 162 and at least one corresponding contact pin from male end 166. If an embodiment of the invention does not include a leak detection system, then junction box 150 connecting wiring of coil 128 with wiring 142 of flexible conduit may be replaced with a single electrical connector disposed within drum 102.

A leak detection system according to the invention further includes a differential pressure detector or detectors. Differential pressure detectors may be disposed to be in fluid communication with flexible conduit 116, but most preferably a leak detection system according to the invention comprises a single pressure differential detector installed in the article of equipment which is attached to and in fluid communication with equipment end 191 of flexible conduit 116. Referring briefly to FIG. 7 it is seen that equipment article, shown as camera assembly 200, can have disposed therein a differential pressure detector 275 having a first pressure port 276 exposed to the interior of equipment article 200 and a second pressure port 277 exposed to the exterior of equipment article 200 though channel 278 formed in equipment article 200. Differential pressure detector 275 produces a signal or signals which are input into a control unit 279, typically connected to feeder conduit 130. Control unit 279 may be formed to generate indicia indicating pressure inside and/or outside of equipment article 200, depending on the values of such signals. Control unit 279 may also be made to generate indicia alerting that a leak has occurred if differential pressure detector 275 senses a loss of positive pressure differential between the interior and exterior of equipment article 200, and may be made to generate a control signal which cuts off voltage supplied to wiring 142 if differential pressure detector 275 senses a loss of positive pressure differential between the interior and exterior of equipment article 200. A loss of positive pressure differential is sensed when the pressure differential sensed by differential pressure sensor falls below about 0.5 PSIG. When flexible conduit 116 and equipment article 200 are pressurized and not leaking, differential pressure sensor 275 will sense a positive pressure differential between the interior and the exterior of equipment article 200.

A differential pressure sensor may also be disposed to have a pressure port in fluid communication with flexible conduit 116 or with junction box 150. For example, a tube extending from a pressure port of a differential pressure sensor (which would have a second port exposed to the exterior of flexible conduit 116) could be formed to penetrate a wall of flexible conduit 116, perhaps at drum end 156 of conduit 116 within drum 102. A tube extending from a pressure port of a differential pressure sensor could also be received by junction box 150.

The remote article of equipment to which flexible conduit 116 of reel 100 is connected may require electrical power, such as an electrical power tool or an electrical lamp. The article of equipment may also require means for supplying control signals thereto, and may also require means for transmitting control signal therefrom. The reel of the invention is especially useful with articles of equipment which are controlled from a remotely-located control unit, and which have sensors which produce signals which are sent to a control unit. A camera assembly 200, as shown in FIGS. 6–15 which is controlled from a remote control unit, and which sends image signals to the remotely located control unit can be electrically coupled with the control unit through reel 100.

Reel 100 may be used in combination with a pulley means 180, as illustrated in FIG. 1 such that the reel can be used to lift and lower articles of equipment requiring electrical power or control. As shown in FIG. 1, pulley means 180 can be mounted above reel 100 on support frame 185 and flexible conduit 116 is routed through pulley means 180 and secured to an equipment article such that the equipment article is lifted and lowered by rotating drum 102.

A camera assembly according to the invention is shown in FIGS. 6–15. Assembly 200 includes an elongated cylindrical chamber 202, which is lowered into a viewing area by way of conduit 204. Conduit 204 may be rigid or flexible, but must be of sufficient strength to support assembly 200. Conduit 204 houses wiring for power and control of equipment in chamber 202 and for transmitting image and control signals from equipment in chamber 202. Conduit 204 may be a flexible conduit, such as 116 previously described, and may be carried by an electrical wiring reel 100 as described in connected with FIGS. 3–5.

Chamber 202 comprises head 206 and body 208. Body 208 is received in head 206 and rotates about axis 210 of stationary head 206. Formed at top 212 of head 206 is plug 214 welded or otherwise attached and sealed to interior wall 228 of head 206. Female end 213 of an electrical connector is received in hole 216 of plug 214 and sealed such that essentially no fluid passes from assembly exterior 217 into interior 218 of assembly through plug hole 216. Male end 220 of connector formed at assembly end 222 of conduit 204 is received by female end 213 and includes securing means which secure male connector 220 to female connector with sufficient force to support the weight of chamber 202. The connector having female end 213 and male end 220 may be a standard electrical connector such as a "LEMO" Series E or Series K connector.

Cover 226 attached to plug and disposed about conduit 204 protects male connector 222 from objects, such as tank covers or bore hole walls, which come into contact with cover 226 during use of assembly 200. Cover 226 is formed to be frustroconical so as to guide passage of assembly 200 through a small-diameter access hole of a work area upon retrieval of assembly 200.

Referring now to FIG. 8 of the drawings, the engaging means between head 206 and body 208 will be described in detail. Affixed to interior wall 228 of head 206 is inner sleeve 230 having cylinder 232 and mount ring 234. Disposed about inner sleeve is outer sleeve 236. Outer sleeve 236 comprises support flange 238, upper neck 240 and lower neck 242 and is positioned to rotate about inner sleeve 230. Outer sleeve 236 is bolted to body mount ring 244 which is affixed to interior wall 246 of body 208. Thus, it is seen that rotation of outer sleeve 236 about inner sleeve 230 provides rotation of body 208 with respect to stationary head 206.

Outer sleeve 236 is rotated about inner sleeve 230 by rotation motor 248 which is mounted in mount ring 234 of inner sleeve 230. Shaft 250 of motor 248 extends through mount ring 234 and terminates at motor gear 252. Motor gear 252 engages sleeve gear 254 to rotate outer sleeve 236 about inner sleeve 230. Sleeve gear 254 is mounted to or formed about the periphery of upper neck 240 of outer sleeve 236. An additional motor which powers an additional gear, such as gear 255 (see FIG. 9) for engaging sleeve gear 254 should be installed in series with first motor 248 at a point about the circumference of mount ring 234. Installing a plurality of motors in series in mount ring 234 to drive body 208 about head 206 enables smaller motors to be installed in mount ring 234 which preferably has an outer diameter of less than about 3½ inches. Body 208 can be driven about head 206 by installing two 13 RPM, 50 oz.-in. torque DC motors in series in mount ring 234.

Body 208 engages head 206 in an essentially airtight fashion. Head mount ring 258 is formed at head bottom 260 and supports first bearing 262 which rests upon wave spring 264 positioned on head mount ring 258. Wave spring 264 biases bearing 262 upward so that first bearing 262 makes good contact with bottom surface of flange 238 of outer sleeve 236. Movement of outer sleeve 236 upward is limited by second bearing 266, which is interposed between lip 267 of cylinder 232 and top surface 269 of outer sleeve 236. Wave spring 264 further biases outer sleeve 236 toward second bearing 266 and further biases second bearing 266 toward lip 267 of inner sleeve 230. First bearing 262 will not rotate within head 206 and is stabilized by O-rings 268. O-rings 268 both stabilize bearing 262 and prevent air from entering assembly interior 218 through gap 270 formed between head 206 and body 208. Flange 238 and bearing 262 are in sealing contact, but friction between flange 238 and first bearing 262 is small, to allow sliding of flange over first bearing and thus rotation of outer sleeve about inner sleeve 230. Likewise, second bearing 266 is in sealing contact with inner sleeve 230 and outer sleeve 236, but friction between second bearing 266 and inner sleeve 230 and between second bearing 266 and outer sleeve 236 is small to allow sliding between second bearing 266 and inner sleeve 230 or between second bearing 266 and outer sleeve 236. First and second bearings 262 and 266 are self-lubricating solid bearings. If assembly 200 is used in a radiation environment, then first and second bearings 262 and 266 are most preferably bronze bearings.

The present invention's axial rotation means provides controlled axial rotation of chamber 202. Chamber 202 (particularly chamber body 208) can be axially rotated to a precise radial orientation. In a preferred embodiment, a potentiometer 278 is installed in mount ring 234 which is rotated by transducer gear 280 engaging sleeve gear 254. Signals from potentiometer 278 can be input into a control unit at a remote location, which can use the potentiometer signals to produce indicia indicating the position of body 208 with respect to head 206.

Wiring (not shown) extending downward from female connector 213 will pass through cylinder 232 of inner sleeve 230 to provide power and control and/or video signal transport means to equipment in chamber 202. Preferably, body 208 will not rotate about the axis 210 of head 206 more than is necessary to provide full field viewing (360 degrees). Thus, twisting of wiring within assembly will be limited. Wiring should be sufficiently slack so that wiring will not be damaged when body 208 is rotated. In the prior art (for example, in U.S. Pat. No. 4,532,545) constrained space camera assemblies are axially rotated by rotating the conduit which carries the assembly. In the present invention, structural stress is not applied to article 204 during camera rotation as in the prior art method.

Chamber 202 is essentially airtight. Plug 214 and female connector 213 are fixed to top 212 of head 206 in an airtight fashion, window 272 is sealed at assembly bottom 274 in an airtight fashion, and the interface between head 206 and body 208 is such that essentially no air can enter assembly 200 through gap 270 between head 206 and body 208.

Constrained space camera assemblies are often used in environments having combustible gases, such as in chemical waste storage tanks. In prior art devices, a danger of an explosion is present because a combustible gas can easily enter a prior art chamber and can be ignited by a spark from electrical equipment disposed within the chamber. Risk of an explosion is mitigated with the present invention because the assembly is formed to be airtight. Further, the present invention preferably has a leak detection system which may be part of the wiring leak detection system as described previously in connection with FIGS. 3–5.

Chamber 202 may be pressurized by directing air through conduit 204 and into chamber 202 by means of an air pressure source, such as an air pump 117 (see FIG. 3a) in fluid communication with conduit 204. Preferably, air pump 117 is a self-limiting air pump and is capable of producing a pressure of no more than about 5.0 PSIG. For allowing passage of air between conduit 204 and chamber 202, female end 213 and male end 220 of the connector connecting conduit 204 with chamber 202 should be modified by removing at least one corresponding set of contact pins from each end of the connector. Pressurizing chamber 202 prevents gases from entering chamber 202. Chamber 202 is most preferably pressurized to a pressure of between about 1.0 and about 2.0 PSIG. Air can also be directed into chamber 202 through an air hose (not shown) in fluid communication with chamber 202.

A leak detection system according to the invention further has means for sensing pressure within chamber 202. If a pressure drop is sensed, then a leak has occurred in chamber 202, or in either conduit 204 or in chamber 202 if chamber 202 and conduit 204 are in fluid communication.

Pressure sensing means can be provided by installing a differential pressure detector 275 in chamber 202. Differential pressure detector 275 has a first pressure port 276 exposed to the interior of assembly 200 and a second pressure port 277 exposed to the exterior of assembly though channel 278 formed in assembly 200. Differential pressure detector 275 produces a signal or signals which are input into a control unit which may be located remotely from assembly 200, such as at 279 (see FIG. 3a). The control unit may be made to generate indicia indicating pressure inside and outside of assembly 200 depending on the value of such signals. The control unit may also be made to generate indicia alerting that a leak has occurred if differential pressure detector 275 senses a loss of positive pressure differential between the interior and exterior of assembly 200, and may be made to generate a control signal that energizes a relay which cuts off the supply of voltage to wiring of the assembly if differential pressure detector 275 senses a loss of positive pressure differential between the interior and exterior of assembly 200. When assembly 200 is pressurized and not leaking, differential pressure sensor 275 will sense a positive pressure differential between the interior and the exterior of assembly 200. A loss of positive pressure differential is sensed when the pressure differential registered by differential pressure sensor 275 falls to less than about 0.5 PSIG. The control unit can include an electrical circuit having a comparator which compares a signal representing differential pressure from differential pressure sensor 275 with a reference signal, and which causes a control signal to energize a relay associated with a breaker means which cuts off voltage supplied to wiring housed by conduit 204, if the signal from the differential pressure sensor is less than about 0.5 PSIG.

To further ensure safety, it is preferred that all electrical components in assembly 200 are low voltage electrical components. Most preferably, all motors, lamps and cameras in assembly require a voltage of 12 volts or less.

When conduit 204 and chamber 200 are engaged in an essentially airtight fashion and in fluid communication with one another, then conduit 204 and chamber 200 form a continuous housing which houses all electrical components of assembly, including electrical equipment within chamber 202 and wiring within conduit 204 and within chamber 202. Assembly 200 satisfies the requirements for a Class 1, Division 1 Flammability Rating as defined by the National Fire Protection Association when chamber 202 and conduit 204 are in airtight engagement and in fluid communication since a breach occurring at any point in assembly 200 which is exposed to a combustible gas can trigger means for cutting off voltage supplied to electrical components of assembly 200.

A pair of cameras 282 and 284 are disposed in assembly 200. Cameras 282 and 284, which may be "SONY" XC-999 Color Cameras, are disposed side by side in assembly and point downward toward mirror 286 which in the stereoscopic embodiment is fixed at an angle of about 45 degrees from assembly 200.

Cameras 282 and 284 are mounted on mounting apparatus 288 which positions and supports cameras 282 and 284 such that the cameras can move freely both laterally (away from each other) and longitudinally (along the length of chamber 202).

Mounting apparatus 288 includes block 290 which slides longitudinally along an interior wall 289 of assembly. Block 290 has attached thereto guide members 291 and 292 which facilitate sliding of block 290 along tracks 293 and 294 formed on track mount 295 affixed to interior wall 289. Also fixed to block 290 are a plurality of lateral tracks 296 which support cameras 282 and 284 and facilitate lateral movement of cameras 282 and 284. Preferably, each camera is supported by a rear lateral track 296a and a forward lateral track 296b. Camera holders 298 which hold cameras 282 and 284, have formed thereon lateral guide members 300 which engage lateral tracks 296.

Track and guide member combinations according to the invention, including 296 and 300, 293 and 291, and 294 and 292, can be provided by ball bearing slides of the type manufactured by "DEADEAL", Inc. Ball bearing slides of this type comprise two rows of hardened steel balls on both sides of a track, and provide smooth, low friction sliding motion between a stationary track and sliding guide member.

Mounting apparatus 288 is anchored in assembly 200 at focus motor bracket 302. Focus motor bracket 302 carries focus motor 304 and is adapted for attachment to an interior wall 289 of assembly 200. Focus motor bracket 302 is preferably bolted to an interior wall 289 of chamber 202. Elongated shaft 308 extends forwardly from focus motor 304 toward assembly bottom 274. Elongated shaft 308 is threaded and is threadably received by threads of borehole 310 formed in block 290. Rotating elongated shaft 308 in a first direction draws block 290 toward focus motor 304 and rotating elongated shaft 308 in an opposite direction forces block 290 to move away from focus motor 304. Thus, by rotating elongated shaft, cameras 282 and 284, mounted on block can be moved toward and from lenses 312 and 314 in order to focus the cameras.

Shaft support hole 316 formed in chamber 202 receives shaft end 318 and ensures that elongated shaft 308 will remain aligned while it rotates. Thus, shaft support hole 316 ensures that block 290 will move longitudinally along an interior wall 289 of assembly, and helps to prevent lateral movement of block 290 along the assembly's interior wall 289. Focus motor 304 may be a 20 RPM 50 oz.-in. torque DC motor.

Mounting apparatus 288 further includes a cam motor 324. Cam motor 324 is positioned by cam motor holder 326, as shown in FIG. 12 which has stilts 328 and which is adapted for attachment to block 290. Cam motor 324 should be positioned parallel with cameras 282 and 284 lengthwise in chamber 202. Cam motor holder 326 has ring 330 which receives cam motor 324 and pin housing 332 extending forwardly therefrom toward assembly bottom 274.

Referring to FIG. 11, pin housing 332 is formed to surround cam 334 affixed to cam motor shaft 336. Formed on pin housing 332 are pin apertures 338 for holding pins 340. Forward camera holders 298b which slidably engage tracks 296b receive pins 340 of pin housing 332. Each pin receives a spring 342 which is positioned between an outer surface 344 of a camera holder 298b and an inner surface 346 of pin housing 332. Thus, it is seen that springs 342 will normally bias camera holders 298b toward cam 334 and therefore will normally bias cameras 282 and 284 toward one another. Oval cross-sectioned cam 334 has a major axis 346 and a minor axis 348. When minor axis 348 is parallel with pins 340, cameras 282 and 284 will be biased toward one another to a minimum separation distance. When major axis 346 is parallel with pins 340 cameras 282 and 284 will be biased toward one another to a maximum separation distance. Cam motor 324 may be an 8.5 RPM, 50 oz.-in. torque DC motor.

In the prior art, convergence of stereoscopic cameras, which is necessitated when close objects are viewed, is accomplished by angling the cameras toward another so that the axes of the cameras converge at a point in front of the cameras. The prior art approach cannot easily be implemented in a constrained space camera assembly because substantial additional assembly space would be required to accommodate the widened distance between the rear ends of the cameras.

In making the present invention, the inventors discovered that camera convergence, enabling close objects to be viewed, could be provided by separating lenses of a pair of stereoscopic cameras from the cameras and by laterally moving the cameras from one another while keeping the lenses in a fixed position in front of the cameras. The camming means of the present invention, as described, provides lateral separation of stereoscopic cameras in accordance with this concept.

Also in accordance with this concept, it is seen that cameras 282 and 284 and their respective lenses 312 and 314 are separated from one another. Cameras 282 and 284 are mounted on mounting apparatus 288 as described, while lenses 312 and 314 are mounted at lens plate 352. As shown in FIG. 13, lens plate 352 carries a plurality of pairs of lenses, each pair, such as 354 and 356 having a magnification different from original pair 312 and 314. For adjusting magnification (i.e., for zoom), lens plate 352 is rotated so that the pair of lenses having the desired magnification are positioned forward of cameras 282 and 284. Lens plate 352 in the preferred embodiment carries 3 pairs, or 6 lenses, but could carry fewer lenses or additional lenses if cameras 282 and 284 are formed to have smaller diameters, or if the diameter of chamber 202 is enlarged.

Lens plate 352 is operated by zoom motor 360, which may be a 8.0 RPM, 100 oz.-in. torque DC motor. Zoom motor 360 is positioned in cavity 362, a space defined in assembly 200 between cameras 282 and 284, cam motor 324 and block 290 for receiving zoom motor 364. Zoom motor 360 is mounted in assembly 200 on zoom motor bracket 364 which extends the width of assembly perpendicularly with respect to cameras 282 and 284 so as not to interfere with the field of vision of cameras 282 and 284. Lens plate 352 is secured to shaft 366 of zoom motor 360 which extends forwardly from zoom motor bracket 364 toward assembly bottom 274.

As shown in FIG. 7, assembly 200 should include a lighting panel 367 for directing light toward the field of vision. Lighting panel 367 includes a plurality of lamps 368, which may be 12 V dc, 35 W lamps. Preferably, lighting panel 367 is recessed as shown and includes at least one angled lamp 369, which is mounted downward at an angle to improve illumination of a viewing area below assembly 200.

If space constraints allow (if a single camera is mounted in chamber 202, or if chamber 202 is formed to have a diameter larger than 3½ inches) then mirror 286 can be formed to be moveable by actuating a rod disposed within chamber 202. Otherwise, mirror 286 should be mounted on chamber 202 at a fixed angle of about 45 degrees. As shown in FIGS. 14 and 15, mirror 286 may be hingedly connected to edge 370 at chamber bottom 274 by way of mounting hinge 372. A back hinge 374 is mounted to back plate 376 of mirror 286 and receives hinged bar 378 having a first end 380 attached to back hinge 374, a second end 382 disposed in chamber 202, and a middle hinge 384 connecting first 380 and second ends 382. Second end 382 is disposed in chamber 202 through hole 387 at chamber end 370. Hole 387 is formed to snugly receive bar 378, but some seepage of gas from chamber interior 218 through hole 387 is preferred so that any flammable vapors within chamber 202 will be continually flushed out though end 370 of chamber. If assembly 200 has a fixed mirror, then small diametered holes can be formed at chamber end 370 to facilitate flushing of flammable vapors out of chamber 202. First end 380 of bar may comprise two bar members 380a and 380b as shown in FIG. 15. When hinged bar 378 is moved downward, middle 384 and back 374 hinges hinge to urge mirror about mounting hinge 372. Thus, angle 388 formed between mirror 286 and assembly bottom 274 can be adjusted by moving second end 382 of bar 378 longitudinally within chamber 202. Hinged bar 378 may be moved longitudinally within chamber 202 by way of window motors 390 having gears 392 which engage threads 394 formed along second end 382 of bar 378. It is recognized that by adjusting angle 388 of mirror 286, the field of vision can be changed from 90 degrees downward to 45 degrees perpendicular to zero degrees upward. As mirror angle 388 approaches zero, the field of vision will become increasingly obstructed by chamber 202.

Figures 6, 16:
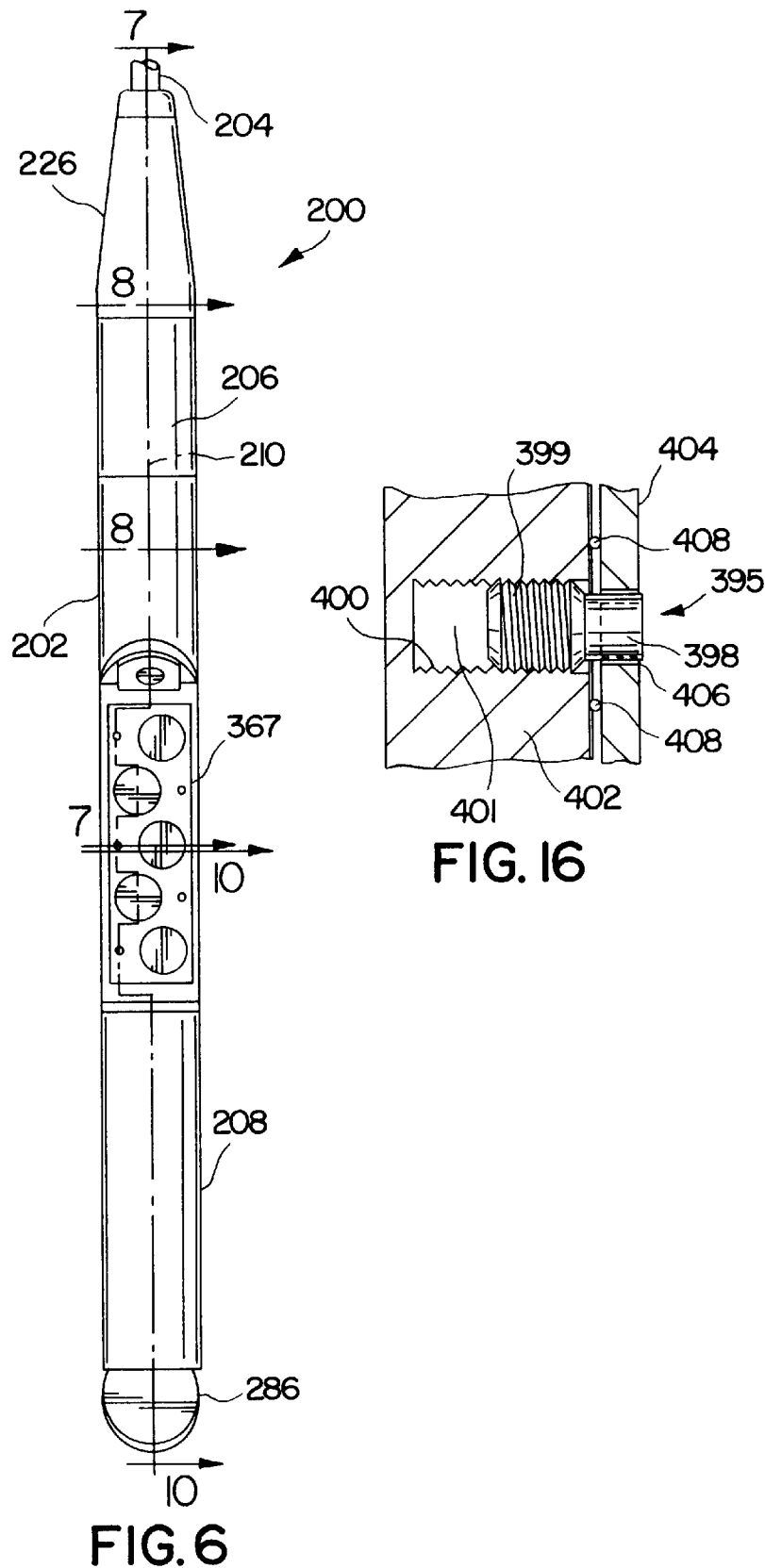
FIG. 6 is a front view of a camera assembly according to the invention.
FIG. 16 is a fragmentary cross-sectional view of the camera assembly showing means according to the invention for attaching sections of the assembly's chamber together.

Sections of chamber 202 are preferably secured together using modified set screws 395. For example, cover 226 and plug 214, body bottom 396 and lighting panel section 397 of body 208, window 272 and chamber 202, mount ring 244 and body 208, and mount ring 258 and head 206 are all secured together using modified set screws 395. A modified set screw arrangement is shown in FIG. 16. Modified set screw 395 includes screw head 398 and a threaded portion 399. Threaded portion 399 threadably engages threads 400 formed in hole 401 of solid member 402. Depending on where set screw 395 is installed, solid member 402 may be, for example, plug 215, a mount ring such as 244, or a window mount for window 272. When modified set screw 395 is threaded all the way into hole 401, then chamber section wall 404 may be moved into a position such that hole 406 of wall 404 is aligned with screw head 398 as shown. Wall hole 406 is sized to have a diameter slightly larger than that of screw head 398. When set screw 395 is threaded outwardly from threaded hole 401, screw head 398 is received in wall hole 406. When engaged with wall hole 406, set screw 395 prevents vertical sliding between solid member 402 and chamber section wall 404. O-rings 408, which form a seal between solid member 402 and chamber section wall 404 when screw head 398 engages wall hole 406, prevent air from entering chamber interior 218 through wall hole 406 or through the interface between an end of a chamber section and a solid member 402.

When chamber 202 is disassembled, modified set screws 395 will be received in threaded holes 401 of chamber 202, and individualized handling of the small screws will not be necessary. This arrangement is particularly advantageous where chamber 202 is assembled and disassembled in a contaminated area using robotic equipment.

Where modified set screws 395 are used to secure sections of chamber 202 together, a plurality of such set screws 395 are installed about the circumference of chamber 202 to provide such securing. Preferably, six equally spaced set screws 395 are installed about the circumference of chamber 202 in order to secure, for example, mount ring 258 onto head 206 or mount ring 244 onto body 208. Cover 226 may be attached to head 206 using, a pair of modified set screws 395.

It will be clear to those skilled in the art to which the present invention pertains from a reading of the foregoing that many changes and substitutions can be made to the preferred embodiments without departing from the spirit and scope of the present invention, which is defined by the appended claims.

What is claimed is:

1. A camera assembly for use in constrained space, said assembly comprising:

a chamber having an interior;

mounting means for holding a camera; said mounting means located in said interior of said chamber;

a camera mounted on said mounting means;

a means for pressurizing said chamber, said means for pressurizing positioned remotely from said chamber and in fluid communication with said chamber; and a lens plate located in said interior of said chamber; said lens plate carrying a first pair of lenses; said lens plate carrying a second pair of lenses; said second pair of lenses having a magnification different from that of said first pair of lenses;

means for rotating said lens plate; said rotation means located in said interior of said chamber; whereby said second pair of lenses is positioned forward of said camera;

whereby magnification of said camera is adjusted by rotating said lens plate.

2. The assembly of claim 1, further comprising:

differential pressure sensing means for sensing a pressure differential between said interior and an exterior of said chamber; said differential pressure sensing means located in said interior of said chamber.

3. The assembly of claim 2, further comprising:

means in communication with said differential pressure sensing means for cutting off electrical power to said chamber when said differential pressure sensing means senses a loss of positive pressure in said interior of said chamber.

4. The assembly of claim 1, further comprising:

a conduit extending from said chamber, said conduit housing wiring which transports signals that power and control said camera and which transports signals from said camera, said conduit being in fluid communication with said chamber;

said pressurizing means in fluid communication with said conduit for pressurizing said conduit and said chamber;

differential pressure sensing means for sensing a pressure differential between said interior and an exterior of said chamber; said differential pressure sensing means located in said interior of said chamber; and means in communication with said differential pressure sensing means for cutting off electrical power to said chamber when said differential pressure sensing means senses a loss of positive pressure in said interior of said chamber.

5. The assembly of claim 1, further comprising:

a lens positioned forward of and spaced apart from said camera.

6. The assembly of claim 1, wherein said assembly further comprises a mirror attached to said chamber forward of said camera and wherein said chamber further comprises:

a head;

a body rotatably engaged with said head; said mounting means and said camera located in said interior of said body; and means for rotating said body with respect to said head; said rotating means located in said interior of said chamber; whereby said body is rotated about said head to radially adjust a field of vision of said camera.

7. A camera assembly for use in constrained space, said assembly comprising:

a chamber having an interior;

mounting means for holding a pair of cameras; said mounting means located in said interior of said chamber;

a pair of cameras mounted on said mounting means;

a forward pair of lenses positioned forward of and spaced apart from said cameras;

a lens plate located in said interior of said chamber; said lens plate carrying said first pair of lenses; said lens plate carrying a second pair of lenses; said second pair of lenses having a magnification different from that of said first pair of lens;

means for rotating said lens plate; said rotation means located in said interior of said chamber; whereby said second pair of lenses is positioned forward of said pair of cameras;

whereby magnification of said cameras is adjusted by rotating said lens plate.

8. The assembly of claim 7, further comprising:

means engaging said pair of cameras for moving said cameras laterally away from one another, whereby said cameras are converged for viewing close objects.

9. The assembly of claim 7, wherein said mounting means comprises:

a mounting apparatus;

means carried by said mounting apparatus for allowing longitudinal movement of said mounting apparatus along said interior of said chamber;

means carried by said mounting apparatus for allowing lateral movement of said cameras on said mounting apparatus;

means mounted on said interior of said chamber for moving said mounting apparatus along said interior;

means carried by said mounting apparatus for moving said cameras laterally apart;

whereby said cameras are focused by moving said mounting apparatus along said interior, and whereby said cameras are converged by moving said cameras laterally apart.

10. The assembly of claim 7, wherein said mounting means comprises:

a block having a plurality of lateral tracks formed thereon extending laterally across said interior of said chamber;

a longitudinal track formed on said interior of said chamber;

a longitudinal guide member carried by said block, said longitudinal guide member slidably engaging said longitudinal track;

a pair of camera holders for holding said cameras, each camera holder having a lateral guide member slidably engaging one of said lateral tracks of said block;

separating means engaging said camera holders for laterally separating said camera holders;

moving means mounted to said interior of said chamber for moving said block longitudinally along said longitudinal track;

whereby said cameras are focused by moving said cameras longitudinally along said longitudinal track, and whereby said cameras are converged by laterally separating said cameras.

11. The assembly of claim 7, wherein said assembly further comprises a mirror attached to said chamber forward of said camera and wherein said chamber further comprises:

a head;

a body rotatably engaged with said head; said mounting means and said cameras located in said interior of said body; and means for rotating said body with respect to said head; said rotating means located in said interior of said chamber; whereby said body is rotated about said head to radially adjust a field of vision of said camera.

12. The assembly of claim 7, wherein said chamber comprises a head and a body, said body rotatably engaged with said head, said assembly further comprising:

an inner sleeve affixed to said interior of said head, said inner sleeve having a lip;

an outer sleeve surrounding said inner sleeve, said outer sleeve being affixed to said body, said outer sleeve including a flange having an engaging surface;

a head mount ring affixed to said interior of said head, said head mount ring having a surface facing said engaging surface of said flange;

a first self-lubricating solid bearing interposed between said head mount ring and said engaging surface of said flange;

means for forming a seal between said first self-lubricating solid bearing and said interior of said head;

a second self-lubricating solid bearing interposed between said outer sleeve and said lip of said inner sleeve;

spring means interposed between said head mount ring and said first self-lubricating solid bearing, said spring means biasing said first self-lubricating solid bearing toward said flange, said spring means further biasing said outer sleeve toward said second self-lubricating solid bearing, and further urging said second self-lubricating solid bearing toward said lip;

whereby a seal is formed between said head and body, and whereby said body can be rotated about said head without breaking said seal.

13. The assembly of claim 7, further comprising:

pressurizing means in fluid communication with said chamber for pressurizing said chamber;

differential pressure sensing means for sensing a pressure differential between said interior and an exterior of said chamber; said differential pressure sensing means located in said interior of said chamber; and means in communication with said differential pressure sensing means for cutting off electrical power to said chamber when said differential pressure sensing means senses a loss of positive pressure in said interior of said chamber.

14. The assembly of claim 7, further comprising:

a conduit extending from said chamber, said conduit housing wiring which transports signals that power and control said camera and which transports signals from said camera, said conduit being in fluid communication with said chamber;

pressurizing means in fluid communication with said conduit for pressurizing said conduit and said chamber;

differential pressure sensing means for sensing a pressure differential between said interior and an exterior of said chamber; said differential pressure sensing means located in said interior of said chamber; and means in communication with said differential pressure sensing means for cutting off electrical power to said chamber when said differential pressure sensing means senses a loss of positive pressure in said interior of said chamber.

15. A camera assembly for use in constrained space, said assembly comprising:

a chamber having an interior;

a pair of cameras located in said interior of said chamber;

a pair of lenses located in said interior of said chamber; said pair of lenses positioned forward of said cameras and spaced apart from said cameras;

a mounting apparatus located in said interior of said chamber for mounting said pair of cameras to said interior of said chamber; said mounting apparatus comprising:

a block having a plurality of lateral tracks formed thereon extending laterally across said interior of said chamber;

a longitudinal track formed on said interior of said chamber;

a longitudinal guide member carried by said block, said longitudinal guide member slidably engaging said longitudinal track;

a pair of camera holders for holding said cameras, each camera holder having a lateral guide member slidably engaging one of said lateral tracks of said block;

separating means simultaneously engaging in tandem both of said camera holders for lateral movement of said camera holders;

moving means mounted to said interior of said chamber for moving said block longitudinally along said longitudinal track;

whereby said cameras are focused by longitudinally moving said block, and whereby said cameras are converged by lateral movement of said cameras;

said separating means comprises a cam interposed between said camera holders, a means mounted on said block normally biasing said holders toward said cam, means mounted on said block for rotating said cam, whereby said holders are separated from each other;

said block further comprises a threaded longitudinal hole formed therein; and said moving means comprises a motor having a shaft, threads formed on said shaft threadably communicating with said hole;

whereby rotation of said shaft in a first direction urges said block longitudinally toward said pair of lenses, and rotation of said shaft in an opposite direction draws said block from said pair of lenses.

16. A camera assembly for use in constrained space, comprising:

a chamber having an interior;

mounting means for holding a camera; said mounting means located in said interior of said chamber;

a camera mounted on said mounting means;

pressurizing means in fluid communication with said chamber for pressurizing said chamber;

a lens plate located in said interior of said chamber; said lens plate carrying a first and a second lens; said second lens having a magnification different from said first lens; said first lens being positioned forward of said camera and spaced apart from said camera;

means for rotating said lens plate; said rotation means located in said interior of said chamber; whereby said second lens is positioned forward of said camera, and whereby magnification of said camera is adjusted by rotating said lens plate;

track means carried by said mounting means for allowing longitudinal movement of said mounting means along said interior of said chamber; and moving means mounted on said interior of said chamber for moving said mounting means along said interior; whereby said camera is focused by moving said camera toward and from said lens plate.

17. A camera assembly for use in constrained space, said assembly comprising:

a chamber having an interior;

mounting means for holding a camera; said mounting means located in said interior of said chamber;

a camera mounted on said mounting means;

pressurizing means in fluid communication with said chamber for pressurizing said chamber;

a mirror hingedly attached to an end of said chamber, said mirror having a hinge, a mirror surface and a back plate, said mirror positioned forward of said camera and extending to an exterior of said chamber, said mirror forming an angle with said chamber;

a rod having a first end, a middle pivot point, and a second end, said first end hingedly connected to said back plate, said second end located in said interior of said chamber; and means mounted to said interior of said chamber for moving said rod longitudinally along the length of said assembly so that said mirror is pivoted about said hinge to change said angle;

whereby a field of vision of said camera is changed by longitudinally moving said rod.

18. A camera assembly for use in constrained space, said assembly comprising:

a chamber having an interior, a head and a body rotatably engaged with said head;

mounting means for holding a camera; said mounting means located in said interior of said chamber;

a camera mounted on said mounting means;

pressurizing means in fluid communication with said chamber for pressurizing said chamber;

an inner sleeve affixed to said interior of said head, said inner sleeve having a lip;

an outer sleeve surrounding said inner sleeve, said outer sleeve being affixed to said body, said outer sleeve including a flange having an engaging surface;

a head mount ring affixed to said interior of said head, said head mount ring having a surface facing said engaging surface of said flange;

a first self-lubricating solid bearing interposed between said head mount ring and said engaging surface of said flange;

means for forming a seal between said first self-lubricating solid bearing and said interior of said head;

a second self-lubricating solid bearing interposed between said outer sleeve and said lip of said inner sleeve;

spring means interposed between said head mount ring and said first self-lubricating solid bearing, said spring means biasing said first self-lubricating solid bearing toward said flange, said spring means further biasing said outer sleeve toward said second self-lubricating solid bearing, and further urging said second self-lubricating solid bearing toward said lip;

whereby a seal is formed between said head and body, and whereby said body can be rotated about said head without breaking said seal.

* * * * *